(12) United States Patent
Furukawa et al.

(10) Patent No.: US 8,937,986 B2
(45) Date of Patent: Jan. 20, 2015

(54) PACKET COMMUNICATION SYSTEM, EMISSION CONTROL APPARATUS, ANTENNA CONTROL METHOD AND COMPUTER PROGRAM

(75) Inventors: Hiroshi Furukawa, Fukuoka (JP); Osamu Muta, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 84 days.

(21) Appl. No.: 13/821,722

(22) PCT Filed: Sep. 7, 2011

(86) PCT No.: PCT/JP2011/070366
§ 371 (c)(1),
(2), (4) Date: May 20, 2013

(87) PCT Pub. No.: WO2012/033124
PCT Pub. Date: Mar. 15, 2012

(65) Prior Publication Data
US 2013/0272345 A1  Oct. 17, 2013

(30) Foreign Application Priority Data

Sep. 8, 2010  (JP) .................................. 2010-201144

(51) Int. Cl.
*H04B 7/17* (2006.01)
*H04B 7/155* (2006.01)
(Continued)

(52) U.S. Cl.
CPC ............. *H04B 7/15528* (2013.01); *H01Q 3/24* (2013.01); *H01Q 9/16* (2013.01); *H01Q 21/24* (2013.01); *H04B 7/10* (2013.01); *H04B 7/0602* (2013.01); *H04B 7/0802* (2013.01)
USPC .......................................... 375/211; 375/224

(58) Field of Classification Search
USPC .......................... 375/211, 213, 224, 229, 222
See application file for complete search history.

(56) References Cited

U.S. PATENT DOCUMENTS

2004/0121740 A1   6/2004   Miyano
2006/0045079 A1*  3/2006   Bahls et al. ................... 370/389
(Continued)

FOREIGN PATENT DOCUMENTS

AU   2003208014   9/2003
CN   1509529      6/2004
(Continued)

*Primary Examiner* — Emmanuel Bayard
(74) *Attorney, Agent, or Firm* — Rankin, Hill & Clark LLP

(57) ABSTRACT

A packet communication system etc., is proposed, which can automatically adjusting the antenna directionality without modifying a wireless interface of a wireless packet forwarding device even if it involves fluctuation in the packet transmission timing due to CSMA/CA etc. An interference evasion unit involves fluctuation in packet transmission timing due to CSMA/CA. A radio emission device can control the emissive direction and/or emission intensity. A packet generation unit adjusts packet features other than its contents (e.g., packet length, transmission intensity) based on a switching sequence for specifying the emissive direction and/or emissive intensity, and generate a switching control packet. An emission control unit measures the switching control packet feature other than its contents, and identifies at least one bit as antenna control information. The emission control unit controls the overall directionality of a directional antenna unit based on a bit sequence including at least one bit thus identified.

8 Claims, 16 Drawing Sheets

(51) Int. Cl.
*H01Q 3/24* (2006.01)
*H01Q 9/16* (2006.01)
*H01Q 21/24* (2006.01)
*H04B 7/10* (2006.01)
*H04B 7/06* (2006.01)
*H04B 7/08* (2006.01)

(56) References Cited

U.S. PATENT DOCUMENTS

| | | |
|---|---|---|
| 2007/0224953 A1 | 9/2007 | Nakagawa et al. |
| 2008/0180271 A1* | 7/2008 | Ootsuka ............... 340/825.69 |
| 2008/0232258 A1* | 9/2008 | Larsson et al. ............ 370/238 |
| 2009/0285154 A1* | 11/2009 | Gesmundo et al. .......... 370/316 |
| 2011/0158340 A1* | 6/2011 | Swanson ................. 375/267 |
| 2013/0230322 A1* | 9/2013 | Sindhu ..................... 398/49 |

FOREIGN PATENT DOCUMENTS

| | | |
|---|---|---|
| CN | 1947355 | 4/2007 |
| EP | 1371149 | 12/2003 |
| EP | 1742383 | 1/2007 |
| JP | 2002-064321 | 2/2002 |
| JP | 2003-037549 | 2/2003 |
| JP | 2003-318793 | 11/2003 |
| JP | 2005-341531 | 12/2005 |
| WO | 03/071715 | 8/2003 |
| WO | 2005/107099 | 11/2005 |

* cited by examiner

Fig.9
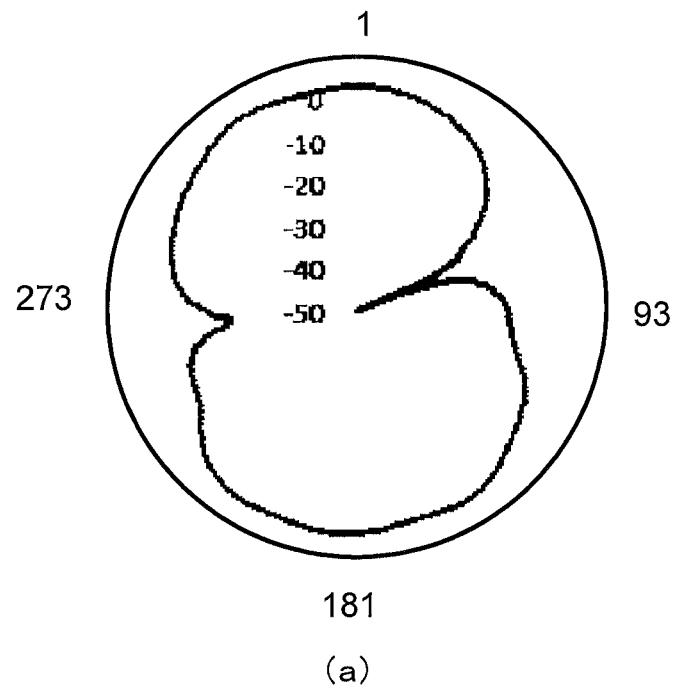
(a)
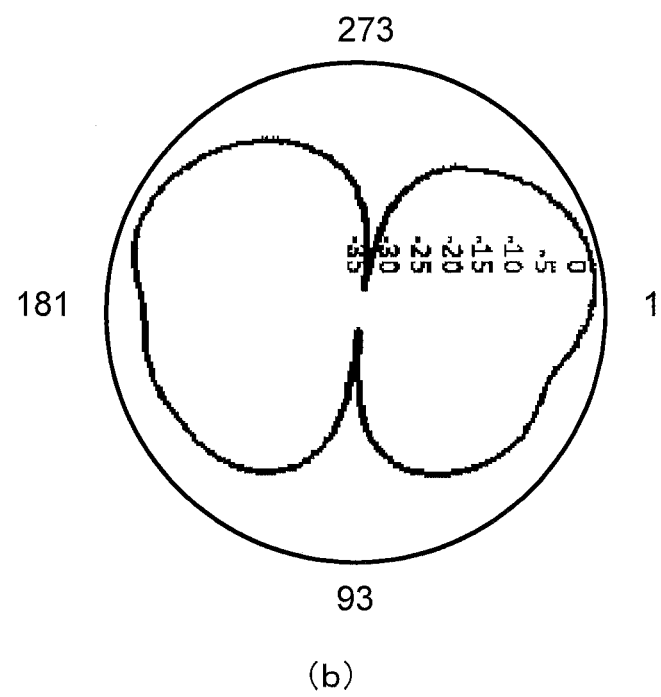
(b)

Model of eight floor of WEST zone 2

PACKET COMMUNICATION SYSTEM, EMISSION CONTROL APPARATUS, ANTENNA CONTROL METHOD AND COMPUTER PROGRAM

TECHNICAL FIELD

The present invention relates to a packet communication system, an emission control apparatus, an antenna control method, and a computer program, and particularly to a packet communication system and the like configured to control the emissive direction and/or the emissive intensity, and to transmit packets.

BACKGROUND ART

As a technique for providing next-generation mobile broadband, Wi-Fi access networks employing a wireless backhaul system are attracting attention. A "wireless backhaul" system is a communication network obtained by wirelessly connecting base stations to each other. With a wireless backhaul system, a wireless relay network (mesh network) is constructed with a core base station as a gateway, each connected to a wired line, thereby covering the service area. With such a wireless backhaul system, a great number of wireless relay base stations are connected to the core base station so as to provide the communication service, thereby suppressing the cost of laying required wired lines. Thus, such an arrangement allows the service area to be expanded and changed with low costs and high flexibility.

The relay line performance of a wireless backhaul system depends on the antenna directionality and installation layout. Typically, a wireless packet forwarding device is installed in a ceiling or on a wall. Accordingly, in many cases, the installation layout is limited by the layout of furniture and fixtures in the building or from the viewpoint of its appearance. Thus, with such a wireless backhaul system, in order to provide stable relay line performance independent of the installation layout or the antenna direction, it is preferable for the antenna directionality to be automatically adjusted according to the installation layout and the like, which is an effective method.

An arrangement employing multiple antennas so as to improve the communication quality is described in Patent Literature 1 and Patent Literature 2, for example. Patent Literature 1 describes an arrangement in which the antenna to be used is selected from among a vertical polarized antenna and a horizontal polarized antenna based on the communication rate of the transmission signal, and wireless communication is performed using the antenna thus selected, so as to reduce interference between signals, thereby providing improved frequency usage efficiency. Patent Literature 2 describes an arrangement in which the wave to be used is selected from among a vertical polarized wave and a horizontal polarized wave based on the measured value of the output of a mobile terminal with respect to the transmission wave, and the wave thus selected is assigned as the transmission/reception wave.

CITATION LIST

Patent Literature

[Patent Literature 1]
  Japanese Patent Application Laid Open No. 2003-318793
[Patent Literature 2]
  Japanese Patent Application Laid Open No. 2002-64321

SUMMARY OF INVENTION

Technical Problem

However, conventional techniques configured to automatically adjust the antenna directionality are provided assuming from the first that a device is endowed with a function for automatically adjusting the antenna directionality. Accordingly, in order to further provide a function for automatically adjusting the antenna directionality to a wireless packet forwarding device employing a wireless module conforming to the IEEE 802.11 standard, for example, modification of an external antenna only is insufficient, and in actuality such a modification requires modification of the wireless interface of the wireless packet forwarding device.

That is to say, with such an arrangement including an external antenna configured to receive the packets, if the antenna directionality is automatically adjusted based on the information with respect to the transmission source obtained by analyzing the contents of each packet, such an arrangement involves an extreme increase in the processing load for the operation of the external antenna. Thus, in a case in which existing wireless packet forwarding devices are employed with such an external antenna, there is a need to automatically adjust the antenna directionality without analyzing the contents of each packet.

In order to meet this demand, the wireless packet forwarding device must provide additional information to the external antenna, in addition to the contents of each packet. In order to provide such an arrangement, examples of conceivable methods include: a method in which additional information is appended to a transmission signal using a dummy packet or the like; and a method in which additional information is provided as another signal in addition to the transmission signal.

However, a wireless packet forwarding device employing a wireless module conforming to the IEEE 802.11 standard, for example, has a function of automatically detecting an interference signal, and of avoiding the interference signal thus detected (interference evasion function by means of CSMA/CA (Carrier Sense Multiple Access with Collision Avoidance)). This leads to fluctuation in the packet transmission timing. Thus, such an arrangement leads to a phenomenon in which each packet is not transmitted at a predetermined timing (random backoff time), a phenomenon in which, in some cases, a packet is not transmitted (packet transmission suspension), and the like. Thus, in order to allow the wireless packet forwarding device to adjust the antenna directionality simply using a dummy packet or the like, such a hardware configuration must be modified, examples of which include a hardware modification in which the CSMA/CA interference evasion function is eliminated.

Also, in a case in which additional information is provided in addition to the transmission signal, such an arrangement requires a different terminal in addition to the antenna terminal, i.e., requires a wireless interface modification.

Accordingly, it is a purpose of the present invention to provide a packet communication system or the like which is capable of automatically adjusting the antenna directionality without modification of a wireless interface of a wireless packet forwarding device even if the wireless packet forwarding device employs a wireless module that conforms to the IEEE 802.11 standard, for example, that leads to fluctuation in the packet transmission timing due to the CSMA/CA function or the like.

Solution to Problem

The first aspect of the present invention is a packet communication system configured to transmit packets, controlling one of or otherwise both of emissive direction and emissive intensity of the packets, the packet communication system comprising a packet forwarding device, and a radio emission device, wherein the packet forwarding device comprises an antenna terminal connected to the radio emission device, and a packet generation unit configured to generate a switching control packet by changing a property of a packet without changing its contents according to one bit or otherwise a plurality of bits included in a switching sequence which specifies one of or otherwise both of the emissive direction and the emissive intensity, and to output the packet thus generated to the radio emission device via the antenna terminal, and wherein the radio emission device comprises a directional antenna which allows one of or otherwise both of the emissive direction and the emissive intensity to be controlled, a signal analysis unit configured to identify one bit value or otherwise a plurality of bit values by analyzing the property of the switching control packet without analyzing the contents of the switching control packet, and an antenna control unit configured to control one of or otherwise both of the emissive direction and the emissive intensity of the directional antenna unit based on a bit sequence including the one bit or otherwise the plurality of bits thus identified.

The second aspect of the present invention is the packet communication system of the first aspect, wherein the packet generation unit is configured to change the property of the switching control packet without changing its contents by generating the switching control packet by changing one of or otherwise both of a packet length parameter and a transmission power parameter according to the one bit or otherwise the plurality of bits included in the switching sequence, and wherein the signal analysis unit is configured to identify the one bit value or otherwise the plurality of bit values by analyzing one of or otherwise both of the packet length of the switching control packet and its transmission power.

The third aspect of the present invention is the packet communication system of the first aspect or the second aspect, wherein the directional antenna unit comprises a plurality of communication antennas, and wherein the plurality of communication antennas are each configured as a directional antenna, and are arranged such that a null-point direction of each communication antenna is covered by the other communication antennas, and wherein the switching sequence is configured to specify a part of the plurality of communication antennas, or otherwise to specify weighting information of each of the respective communication antennas, or otherwise to specify a part of the plurality of communication antennas and specify weighting information of each of the communication antennas thus specified, and wherein, based on the bit sequence, the antenna control unit is configured to instruct the part of the communication antennas thus specified to emit radio waves, or otherwise to combine a signal according to the weighting information thus specified and instruct the communication antennas to emit radio waves, or otherwise to instruct the part of the communication antennas thus specified to combine a signal according to the weighting information and emit radio waves.

The fourth aspect of the present invention is the packet communication system of any one of the first aspect through the third aspect, wherein the packet generation unit comprises an interference evasion unit configured to automatically change a transmitting timing of the switching control packet which is generated, independently of generation of the switching control packet, when the packet generation unit outputs the switching control packet to the radio emission device, and wherein the properties of the switching control packet to be analyzed by the signal analysis unit, which are different from the contents of the switching control packet, are maintained after the interference evasion unit changes the transmitting timing.

The fifth aspect of the present invention is the packet communication system of any one of the first aspect through the fourth aspect, wherein the packet generation unit is configured to generate a synchronization control packet for distinguishing the switching control packet from the other kinds of packets, and to control generation of the switching control packet, and wherein, when one bit or otherwise a plurality of bits included in the switching sequence is a predetermined value or otherwise a predetermined value set, the packet generation unit does not generate the switching control packet during a predetermined period of time, and wherein the signal analysis unit is configured to identify one bit value or otherwise a plurality of bit values as the predetermined value or otherwise as the predetermined value set when the signal analysis unit does not detect the switching control packet in a predetermined period of time after it detects the synchronization control packet.

The sixth aspect of the present invention is a packet communication system comprising one core node or otherwise a plurality of core nodes, and a plurality of slave nodes, and configured to provide wireless communication between respective nodes, wherein the core nodes each comprise a packet forwarding device and a radio emission device and a part of or otherwise all of the slave nodes each comprise the packet forwarding device and the radio emission device, and wherein, when a position of any one of the nodes changes, or when the number of core nodes or the number of slave nodes changes, a routing packet is transmitted/received among the core nodes and the slave nodes so as to determine a downward route which is a route from the core node down to the respective slave nodes, and an upward route which is a route from the respective slave nodes up to the core node, and wherein each node comprising the packet forwarding device and the emission control apparatus is configured to determine one of or otherwise both of the emissive direction and the emissive intensity of the emission control apparatus according to a destination node to which the node is to transmit a data packet which is transmitted and received between nodes and which is different from the routing packet, and to determine the reception direction of the emission control apparatus according to a source node from which the node is to receive the data packet, and wherein the packet forwarding device comprises an antenna terminal connected to the radio emission device, and a packet generation unit configured to generate a switching control packet by changing a property of a packet without changing its contents according to one bit or otherwise a plurality of bits included in a switching sequence which specifies one of or otherwise both of the emissive direction and the emissive intensity, and to output the packet thus generated to the radio emission device via the antenna terminal, and wherein the radio emission device comprises a directional antenna which allows one of or otherwise both of the emissive direction and the emissive intensity to be controlled, a signal analysis unit configured to identify one bit value or otherwise a plurality of bit values by analyzing the property of the switching control packet without analyzing the contents of the switching control packet, and an antenna control unit configured to control one of or otherwise both of the emissive direction and the emissive intensity of the directional antenna unit based on a bit sequence including the one bit or otherwise the plurality of bits thus identified, and to output, to the packet forwarding device via the antenna terminal, a received signal obtained by detecting a signal in the reception direction.

The seventh aspect of the present invention is an emission control apparatus connected to an antenna terminal, and configured to control one of or otherwise both of an emissive direction and an emissive intensity of a directional antenna unit which allows one of or otherwise both of the emissive direction and the emissive intensity to be controlled, the emission control apparatus comprising a signal analysis unit configured to identify one bit value or otherwise a plurality of bit values by analyzing a property of a switching control packet detected when detecting a signal of the antenna terminal without analyzing the contents of the switching control packet, and an antenna control unit configured to control one of or otherwise both of the emissive direction and the emissive intensity of the directional antenna unit based on o a bit sequence including the one bit or otherwise the plurality of bits thus identified.

The eighth aspect of the present invention is an antenna control method for controlling one of or otherwise both of an emissive direction and an emissive intensity, the antenna control method comprising signal analyzing in which one bit value or otherwise a plurality of bit values are identified by analyzing a property of a switching control packet detected when detecting a signal of an antenna terminal, the property other than the contents of the switching control packet, and controlling one of or otherwise both of the emissive direction and the emissive intensity of a directional antenna unit which allows one of or otherwise both of the emissive direction and the emissive intensity based on a bit sequence including the one bit or otherwise the plurality of bits thus identified.

The ninth aspect of the present invention is a computer program configured to instruct a computer to function as a signal analysis unit configured to analyze a property of a switching control packet detected when detecting a signal of an antenna terminal, the property other than the contents of the switching control packet, so as to identify one bit value or otherwise a plurality of bit values, and to function as an antenna control unit configured to control one of or otherwise both of an emissive direction and a emissive intensity of a directional antenna unit which allows one of or otherwise both of the emissive direction and the emissive intensity to be controlled, based on a bit sequence including the one bit or otherwise the plurality of bits thus identified.

It should be noted that "A and/or B" means A or B, or otherwise both of A and B. Also, the present invention may be regarded as a computer program configured to instruct a computer to function as a packet generation unit. Also, the present invention may be regarded as a computer-readable recording medium configured to store (not transiently) a computer program, or may be regarded as a computer program product.

Also, the switching control packet is one kind of control packet which can be distinguished from the data packets transmitted/received among respective nodes. For example, the packet generation unit may be configured to generate a synchronization control packet for distinguishing the switching control packet from the data packets, and to generate the switching control packet as the subsequent packet. Also, the signal analysis unit may be configured to detect the synchronization control packet, to judge that the packet detected as the subsequent packet is the switching control packet, and to analyze the characteristic of the switching control packet that differs from its contents. It should be noted that the present invention is not restricted to such a method using the synchronization control packet. Also, any method may be employed as long as the signal analysis unit can distinguish the switching control packet from the other kinds of packets, and can analyze the switching control packet thus distinguished. Furthermore, the characteristic of the switching control packet that differs from its contents, and that is to be analyzed by the signal analysis unit, may be a characteristic that is maintained if the effect of the change of the transmission timing by the interference evasion unit is removed. Moreover, a particular time interval to be measured by the signal analysis unit may be determined giving consideration to fluctuation in the transmission timing provided by the interference evasion unit (for example, the predetermined time interval is set to a time interval that is equal to or greater than the upper limit of fluctuation in the transmission timing of a portion of packets), thereby eliminating a part or all of the adverse effects of fluctuation in the packet transmission timing provided by the interference evasion unit.

Advantageous Effects of Invention

With the invention according to the claims (which will be referred to as the "present invention" hereafter), by adjusting the operation of the packet generation unit and the configuration and the operation of the radio emission device configured as an external antenna system, such an arrangement is capable of automatically adjusting the antenna directionality using the packets themselves even if such an arrangement is configured as a wireless packet forwarding device configured to provide fluctuation in the switching control packet transmission timing by means of CSMA/CA or the like. Thus, by modifying the external antenna, such an arrangement is capable of providing a multi-antenna system while substantially maintaining the hardware configuration of each existing wireless packet forwarding station. In particular, the characteristics of the switching control packet that differ from its contents (e.g., packet length and transmission power) can be maintained at a constant value even if the timing is adjusted. Thus, such an arrangement allows a multi-antenna system to be provided in a sure manner.

As shown in the fifth aspect of the present invention, with intermittent periodic transmit forwarding (IPT), the data packets are basically transmitted and received in a static node layout. Thus, the packet forwarding device may be preferably configured to instruct the radio emission device to automatically adjust the emissive direction and/or the emission density (in particular, the emissive direction and reception direction) for a transmission destination node for each data packet, thereby providing a marked advantage.

BRIEF DESCRIPTION OF DRAWINGS

FIG. 9A is a diagram showing an example of the horizontal directionality pattern obtained by actual measurements using an external multi-antenna system employed in the experiment, and FIG. 9B is a diagram showing an example of the vertical directionality pattern obtained by actual measurements using the external multi-antenna system employed in the experiment.

DESCRIPTION OF EMBODIMENTS

Description will be made regarding embodiments of the present invention with reference to the drawings. It should be noted that the present invention is not restricted to such embodiments.

EXAMPLE 1

Figure 1:
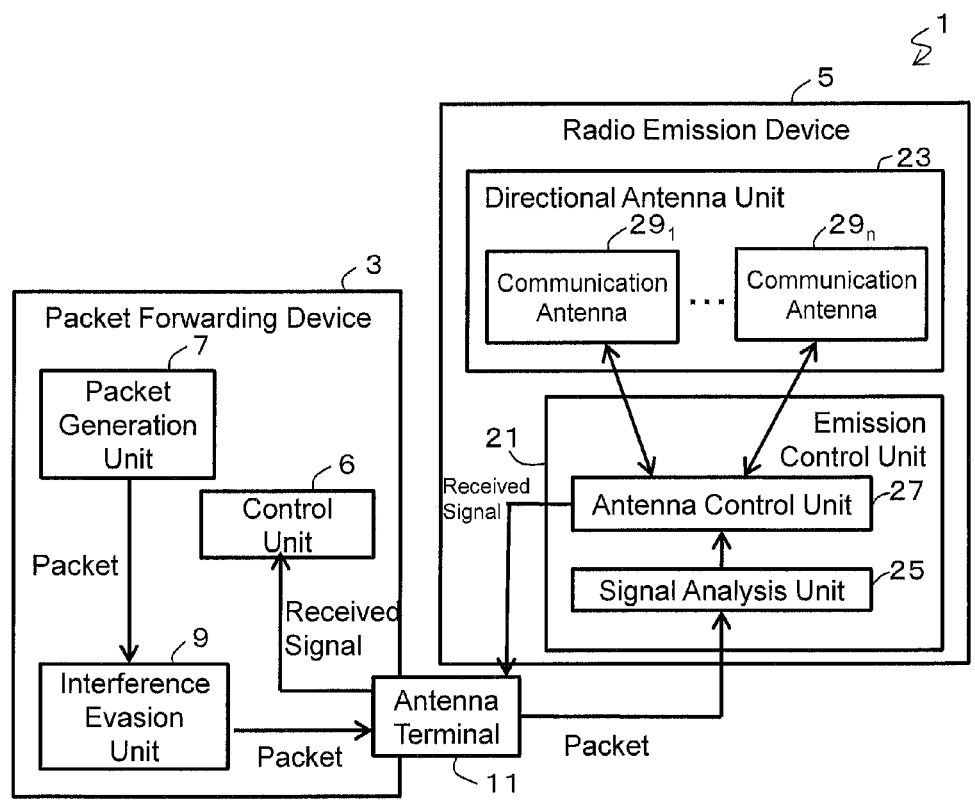
FIG. 1 is a block diagram showing a schematic configuration of a packet communication system 1 according to an embodiment of the present invention.

FIG. 1 is a block diagram showing a schematic configuration of a packet communication system 1 according to an embodiment of the present invention. The packet communication system 1 includes: a packet forwarding device 3 (which is an example of a "packet forwarding device" in the claims) configured to generate packets; and a radio emission device 5 (which is an example of a "radio emission device" in the claims) configured to control the emissive direction and/or the emissive intensity by analyzing the characteristics other than the contents of a switching control packet (specific description will be made later regarding the switching control packet) selected from among the packets thus generated. The packet forwarding device 3 can be configured as an existing packet forwarding device without modification of the wireless interface. The radio emission device 5 is configured as a multi-antenna system configured as an external component connected to the packet forwarding device 3.

The packet forwarding device 3 includes: a control unit 6 configured to control the overall operation of the device; a packet generation unit 7 (which is an example of a "packet generation unit" in the claims) configured to generate packets; an interference evasion unit 9 configured to provide indeterminate fluctuation in the packet transmission timing by means of the CSMA/CA function or the like; and an antenna terminal 11 (which is an example of an "antenna terminal" in the claims) connected to the radio emission device 5.

The radio emission device 5 includes a directional antenna unit 23 (which is an example of a "directional antenna unit" in the claims) which is capable of controlling the emissive direction and/or the emissive intensity; and an emission control unit 21 (which is an example of an "emission control device" in the claims) configured to control the emissive direction and/or the emissive intensity of radio waves, and to instruct the directional antenna unit 23 to emit radio waves.

The directional antenna unit 23 includes multiple communication antennas $29_1$ through $29_n$ (each of which is an example of a "communication antenna" in the claims). It should be noted that each index will be omitted in the following description except in a case in which it indicates a particular communication antenna. The communication antennas 29 are each configured as a directional antenna configured to control the emissive direction and the emissive intensity of radio waves, and to emit radio waves with high intensity in a predetermined direction.

Figure 2:
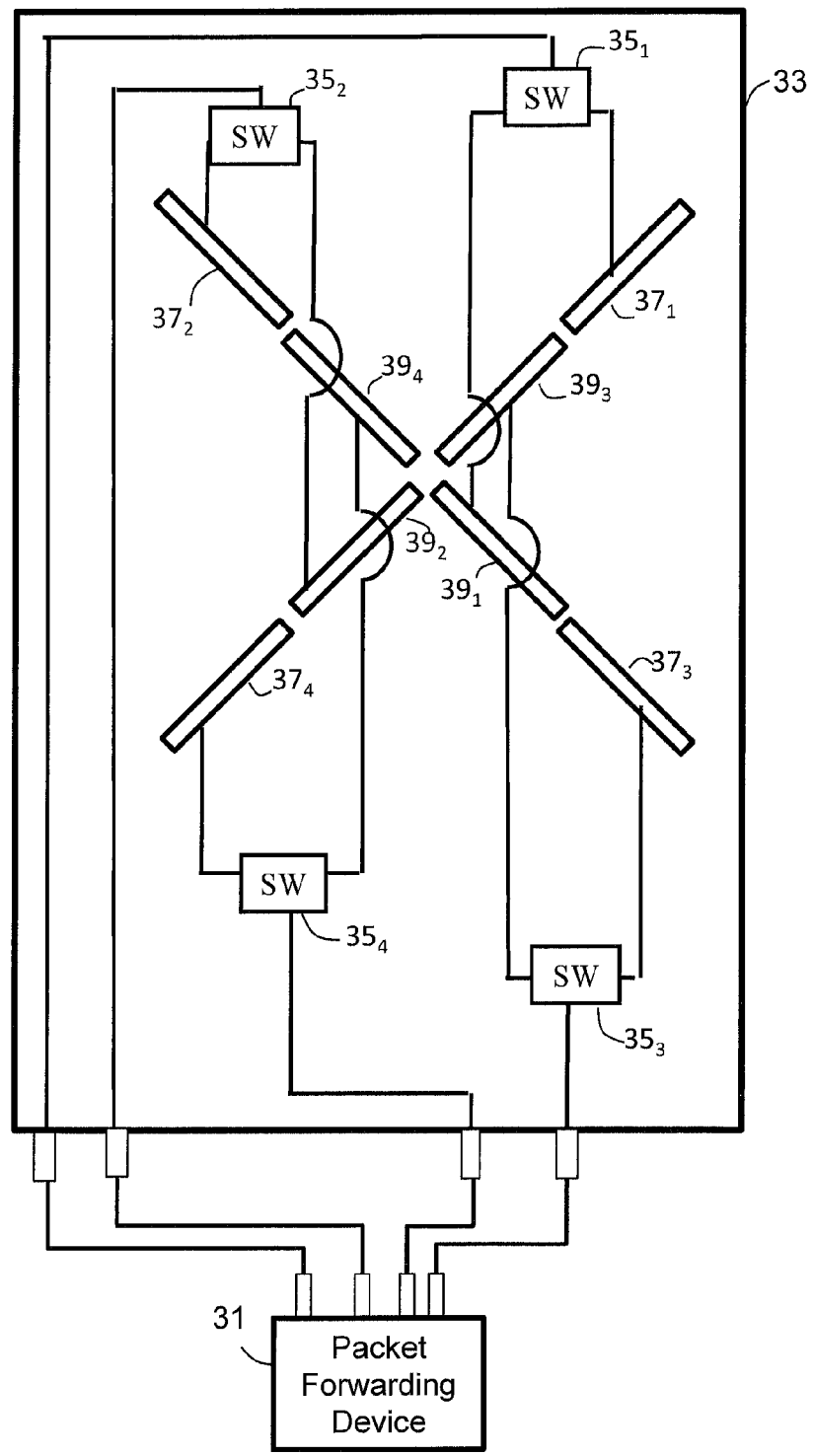
FIG. 2 is a diagram showing an example layout in a case in which the communication antennas 29$_1$ through 29$_n$ shown in FIG. 1 are configured as eight dipole antennas.

FIG. 2 is a diagram showing a layout of the communication antenna according to the present embodiment. A packet forwarding device 31 (which is an example of the packet forwarding device shown in FIG. 1) includes four antenna terminals. A radio emission device 33 (which is an example of the radio emission device 5 shown in FIG. 1) includes four switches $35_1$, $35_2$, $35_3$, and $35_4$. The switches $35_1$, $35_2$, $35_3$, and $35_4$ are respectively connected to the different antenna terminals, and are configured to control the switching operations of antenna combinations, i.e., antennas $37_1$ and $39_1$, antennas $37_2$ and $39_2$, antennas $37_3$ and $39_3$, and antennas $37_4$ and $39_4$ (which is an example of the communication antenna 29 shown in FIG. 1). Here, the antennas 37 are each configured as a dipole antenna, and as a horizontal antenna. The antennas 39 are each configured as a dipole antenna, and as a vertical antenna. By means of the switches 35, radio waves are emitted from only either one of a combination of the antennas 37 and 39 that are denoted by the same index. The antennas 37 and 39 are arranged such that the polarized faces are orthogonal to each other so as to compensate for each other, thereby eliminating null points that occur due to the antenna directionality. Such an orthogonal polarized antenna layout allows the antenna to be controlled so as to provide an optimum directionality according to the communication environment. Such an arrangement allows radio waves to be emitted in all directions regardless of the installation layout of the relay stations, thereby ensuring stable relay line performance. A signal analysis unit 25 is configured to monitor the signal output from all of or otherwise a part of the four antenna terminals, and to detect a switching control packet.

The emission control unit 21 shown in FIG. 1 includes: the signal analysis unit 25 (which is an example of a "signal analysis unit" in the claims) configured to analyze the switching control packet; and an antenna control unit 27 (which is an example of an "antenna control unit" in the claims) configured to control each of the communication antennas 29 based on the analysis result. The signal analysis unit 25 is configured to acquire antenna control information for controlling each of the transmission antennas 29 by analyzing characteristics of the switching control packet other than the contents without analyzing the contents of the switching control packet. The antenna control unit 27 is configured to control the emissions by the transmission antennas 29 based on the antenna control information, and to control the overall directionality of the directional antenna unit 23.

Furthermore, the antenna control unit 27 is configured to transmit a signal (received signal) received by the communication antenna 29 to the control unit 6 via the antenna terminal 11. For example, with directional IPT, the communication antennas by which the data packets transmitted by different nodes are to be received are determined beforehand as will be described later with reference to FIG. 14 (in particular, in Step STR2). Such an arrangement allows the antenna control unit 27 to measure the communication antennas determined beforehand, and to transmit the received signal to the control unit 6.

The interference evasion unit 9 shown in FIG. 1 is configured to indeterminately change the transmission timing of each packet, as with an interference evasion function by means of CSMA/CA, for example, and to output each packet to the radio emission device 5 via the antenna terminal 11.

Figure 3:
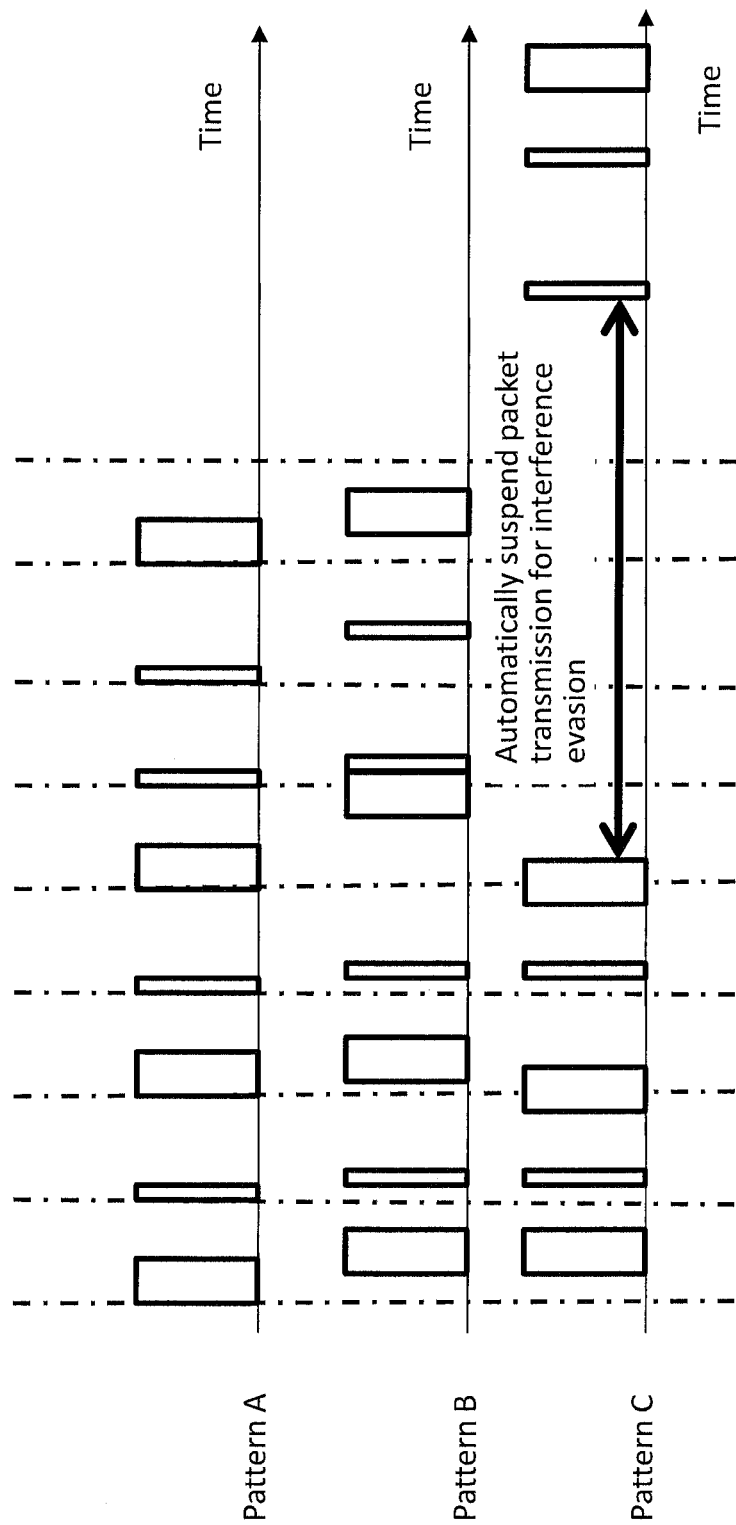
FIG. 3 is a diagram showing an ideal timing (pattern A) and transmission timings (patterns B and C) each having fluctuation provided by an interference evasion unit 9, for each of the packets shown in FIG. 1.

Description will be made with reference to FIG. 3 regarding the interference evasion function by means of CSMA/CA. Ideally, each packet is preferably transmitted at a timing at which it is generated (pattern A). However, the interference evasion function involves random fluctuations in the packet transmission timing. Examples of such fluctuations include: transmission timing fluctuations due to random backoff operations (pattern B); and suspension of packet transmission in order to avoid interference (pattern C), and the like. Thus, in order to extend the functions of the existing wireless packet forwarding device, there is a need to take the effect of the interference evasion function into consideration.

The packet generation unit 7 shown in FIG. 1 is configured to generate multiple packets according to predetermined parameters. Such parameters are stored in an unshown parameter storage unit. Examples of such parameters include: a packet length parameter (for a given packet, the time length from the transmission start time point up to the transmission end time point); a transmission power parameter; a transmission time interval parameter (the period of time from the transmission start time point or otherwise the transmission end time point for a given packet up to the transmission start time point for the next packet); and the like. The packet generation unit 7 is configured to control the period of time from the transmission start time point up to the transmission end time point for each packet according to the value set as the packet length parameter, and to generate each packet thus controlled. Furthermore, the packet generation unit 7 is configured to control the transmission power for each packet according to the value set as the transmission power parameter, and to generate each packet thus controlled. Moreover, the packet generation unit 7 is configured to control the transmission start time point for the next packet according to the value set as the transmission time interval parameter.

With the present embodiment, each of the aforementioned parameters can be set to one of multiple values. Description will be made below regarding an arrangement configured to allow the packet length to be set to one from among two values, i.e., either one of P0 or P1, and to allow the transmission time interval parameter, which is a time interval from the transmission end time point of a given packet up to the transmission start time point of the next packet, to be set to one from among two values, i.e., either one of W0 or W1. Description will be made below assuming that the transmission power parameter is maintained at a constant level. The operation of a typical existing wireless packet forwarding device is controlled according to a program embedded in the device. Thus, if such an arrangement requires only the parameter values to be selectively changed to modify the operation of the packet generation unit 7, such an arrangement can be realized by modifying the embedded program without a need to modify its hardware configuration.

With the present embodiment, when the antenna control information to be transmitted to the signal analysis unit 25 is "1", the packet generation unit 7 sets the data size to 200 [bytes], and sets the packet length parameter P1 to 0.267 [ms]. In some cases, such an arrangement links two packets and detects them as a single packet due to transmission timing fluctuation provided by the interference evasion unit 9 (see the fourth and fifth packets in the pattern B shown in FIG. 3). In this case, it is difficult for the signal analysis unit 25 to detect the packet length with high precision. In order to solve such a problem, the parameter value of the transmission time interval W1 is set to 4.8 [ms]. This allows the signal analysis unit 25 to substantially avoid such linking of multiple packets and detecting them as a single packet. The interference evasion unit 9 is configured to change the transmission timing and not to change each packet. Accordingly, description will be made below regarding an arrangement configured to generate the antenna control information based on a characteristic (packet length) that is not changed by the interference evasion unit 9 from among the characteristics (packet length and transmission time interval) other than the contents set by the packet generation unit 7 for each packet.

When the antenna control information to be transmitted to the signal analysis unit 25 is "0", the data size is set to 650 [bytes], the parameter value of the packet length P0 is set to 0.867 [ms], and the transmission time interval W0 is set to 5.2 [ms]. It should be noted that FIG. 4 shows an arrangement in which the packets B and C each have different data amounts, and are controlled to have the same packet length P0 by adjusting each of their symbol lengths.

Figure 4:
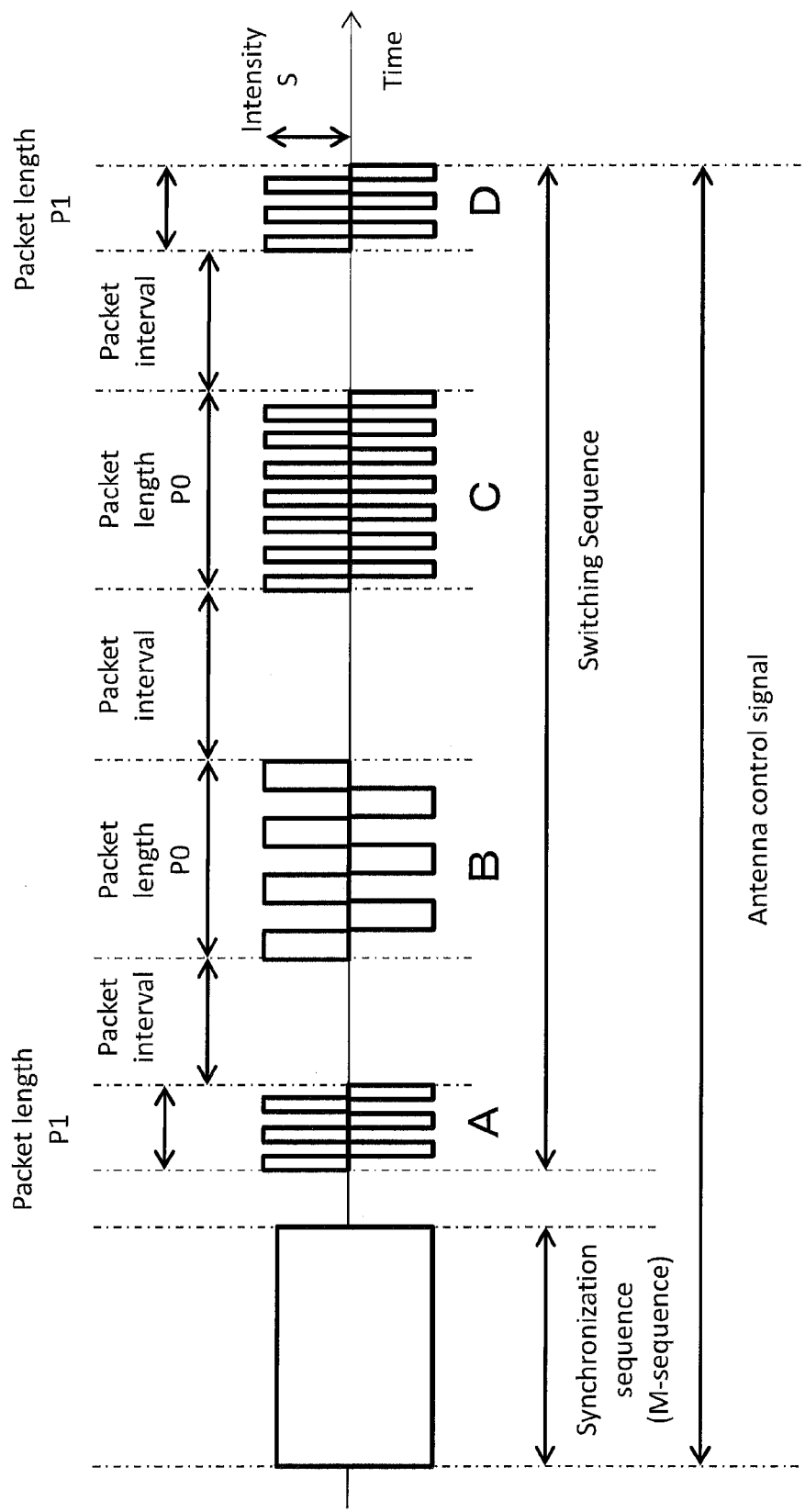
FIG. 4 is a diagram showing an example of a transmission signal provided to a radio emission device 5 shown in FIG. 1.

FIG. 4 shows an example of a transmission signal output to the radio emission device 5. The transmission signal includes a portion (antenna control signal) configured to control the directionality of the directional antenna unit 23. The antenna control signal includes a synchronization control packet which indicates the synchronization sequence and a switching control packet configured as a subsequent packet which indicates the switching sequence. A combination of the synchronization control packet and the switching control packet will be referred to as a "control packet" hereafter.

Figure 5:
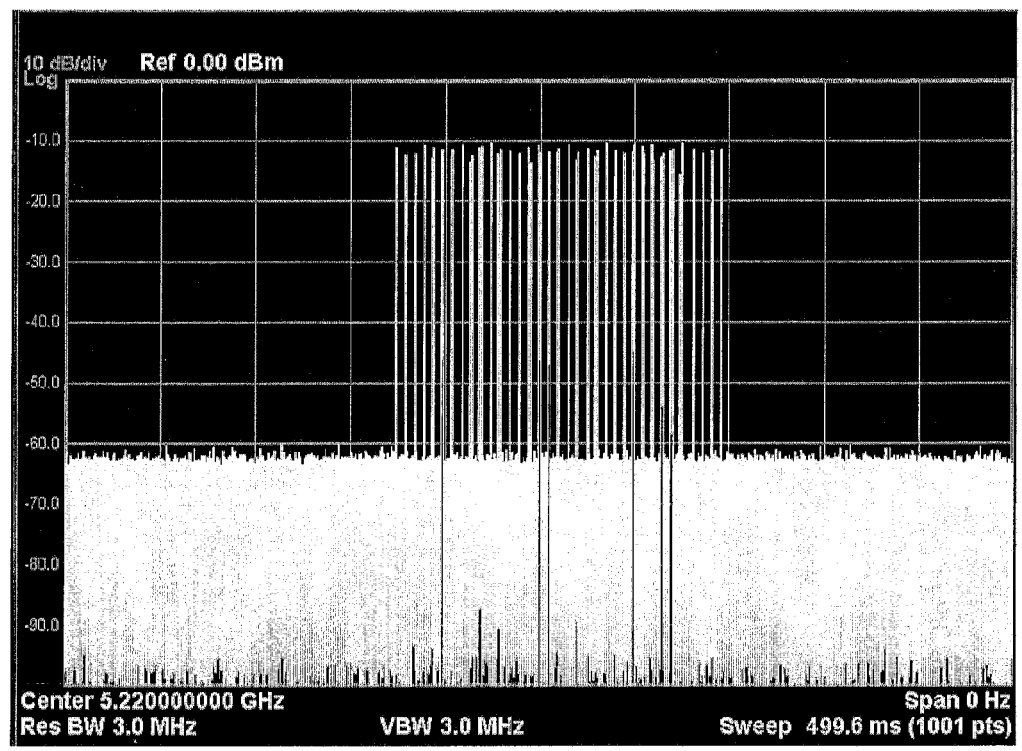
FIG. 5 is a diagram showing an example of a synchronization sequence shown in FIG. 4.

The synchronization control packet is configured for distinguishing whether the detected packet is a control packet or an ordinary data packet. As such a synchronization sequence, control information that corresponds to a random sequence such as an M-sequence or the like is employed, for example. In a case in which an M-sequence having a sequence length U consisting of 0s and 1s is employed as an example of the synchronization sequence, the length U of a synchronization control packet is determined based on the following Expression (1). As an example of such an M-sequence, "1111100110100100001010111011000" (having a sequence length of 31) can be employed. FIG. 5 is a diagram showing an example of the synchronization sequence shown in FIG. 4. Also, various kinds of sequences may be employed as such a synchronization sequence as long as the signal analysis unit 25 can distinguish a control packet from an ordinary data packet. Only when the sequence thus detected matches the synchronization sequence, the signal analysis unit 25 regards the subsequent packet as the switching sequence, and performs an antenna switching control operation.

As a method for the detection of the synchronization sequence by the signal analysis unit 25, the following method may be employed. As such a synchronization sequence, an M-sequence having a sequence length U, i.e., $X[i]$ ($i = 1, 2, \ldots U$), is employed, for example. The signal analysis unit 25 detects the antenna control information (synchronization sequence information), represented by b ∈ {1, 0}, based on the following Expression (1). Here, $T_1$, $T_2$, and $T_3$ each represent a time length, and are each adjusted to a suitable value so as to allow the signal analysis unit 25 to detect the correct antenna control information. With such an arrangement, as represented by Expression (2), a sequence of values, each of which is detected at the time point j by means of the signal analysis unit 25, is represented by b[j]. The signal analysis unit 25 is configured to calculate V[j] according to Expression (3), so as to execute correlation calculation. When V[j]=U, the signal analysis unit 25 regards the information represented by the subsequent packets as being a switching sequence.

[Expression 1]

$$b = \begin{cases} 1 & T_1 \le W < T_2 \\ 0 & T_2 \le W < T_3 \end{cases} \quad (1)$$

$$b[j] = \begin{cases} b & j \ge 1 \\ 0 & j < 1 \end{cases} \quad (2)$$

$$V[j] = \sum_{i=1}^{U} X[i]b[j-U] \quad (3)$$

Figure 6:
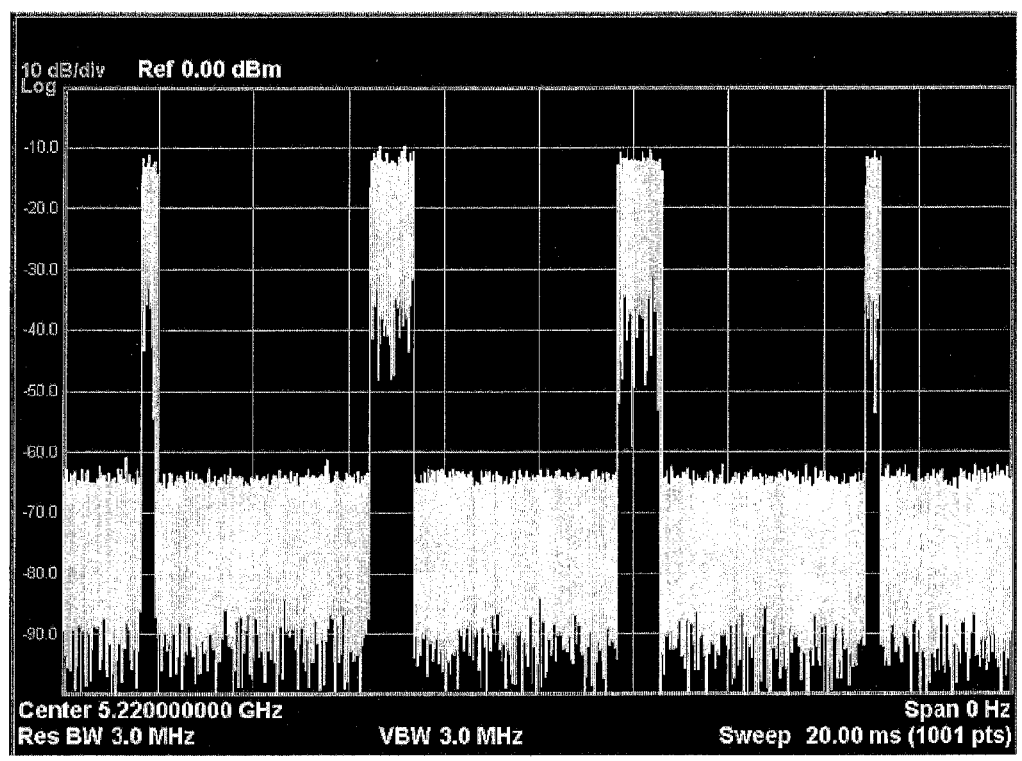
FIG. 6 is a diagram showing an example of a switching sequence shown in FIG. 4.

The emission control unit 21 is configured to control the directionality of the directional antenna unit 23 based on each switching control packet included in the switching sequence. FIG. 4 shows a switching sequence including four packets A, B, C, and D. The packets A and D each have a packet length P1. In this case, the signal analysis unit 25 identifies the antenna control information as "1". The packets B and C each have a packet length P0. In this case, the signal analysis unit 25 identifies the antenna information as "0". Thus, the signal analysis unit 25 identifies the overall antenna control information as "1001". FIG. 6 is a diagram showing an example of a switching sequence.

It should be noted that FIG. 4 shows an example in which, by adjusting the data amount and symbol length, the packets B and C are each configured to have the same packet length. As shown in such an example of the packets B and C, even if the data amount included in a single packet is doubled, by halving the symbol length, the packet length is maintained at the same value. This means that the packet length is not necessarily changed even if the data rate is changed. Also, this means that, in a case in which the data rate is variable, such an arrangement is not necessarily capable of identifying the multiple packets correctly. With the present embodiment, the information to be acquired is the packet length alone. That is to say, the data included in each switching control packet is not restricted in particular.

Figure 7:
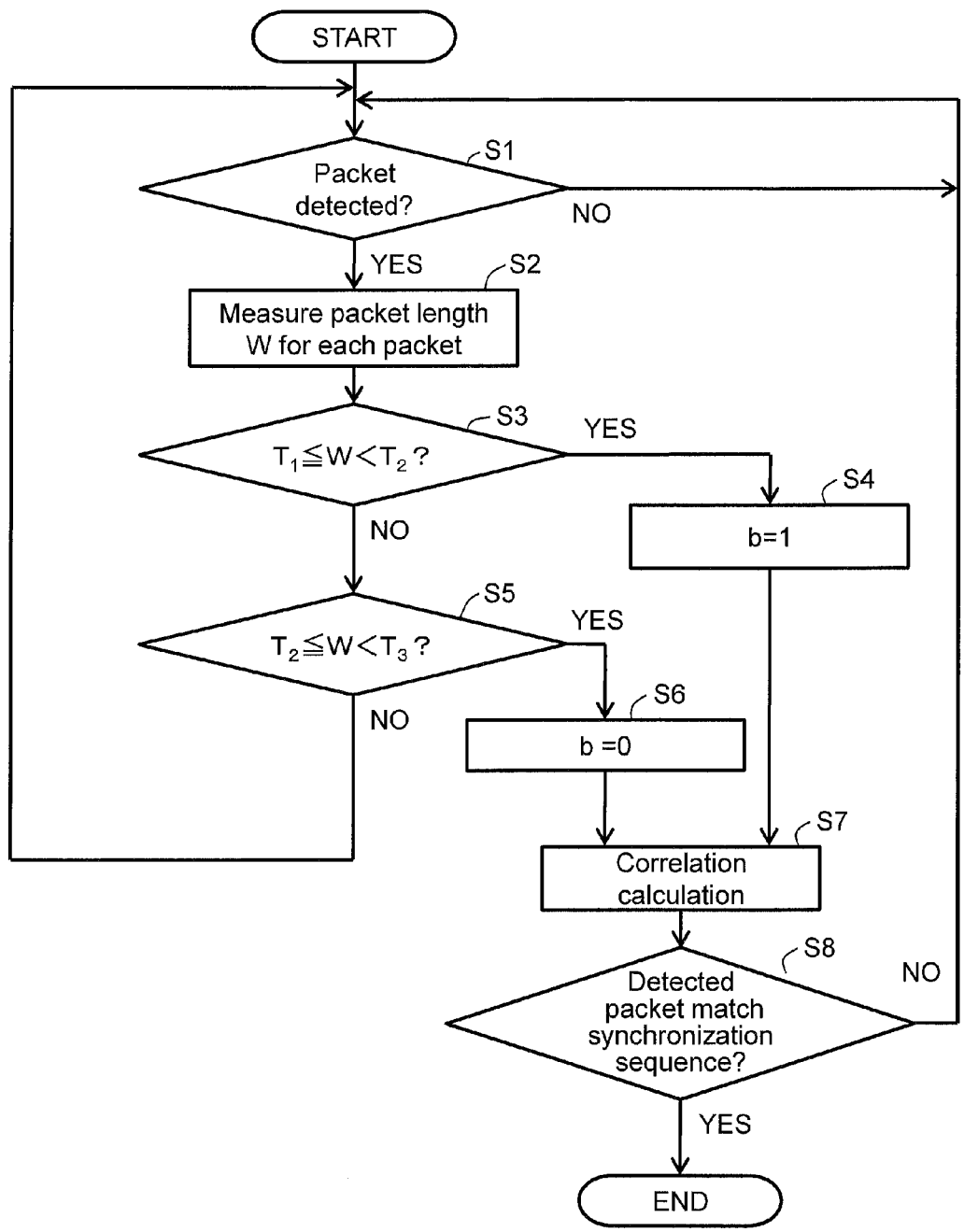
FIG. 7 is a flowchart showing an example of the operation of an emission control unit 21 shown in FIG. 1 for the synchronization sequence shown in FIG. 4.

FIG. 7 is a flowchart showing an example of the operation of the emission control unit 21 shown in FIG. 1, for the synchronization sequence shown in FIG. 4.

The signal analysis unit 25 judges whether or not a packet is detected (Step S1). When no packet is detected, the signal analysis unit 25 continues the packet monitoring until a packet is detected. When a packet is detected, the signal analysis unit 25 measures the period of time from the detected start time point up to the detected end time point with respect to this packet, so as to measure the packet length W of the packet (Step S2).

The signal analysis unit 25 acquires the antenna control information b ∈ {1, 0} using Expression (1). Specifically, when W is equal to or greater than $T_1$ and is smaller than $T_2$ (Step S3), the signal analysis unit 25 takes the antenna control information b to be "1" (Step S4), and when W is equal to or greater than $T_2$ and is smaller than $T_3$ (Step S5), the signal analysis unit 25 takes the antenna control information b to be "0" (Step S6). Furthermore, the signal analysis unit 25 executes the correlation calculation represented by Expression (2) so as to check whether or not the sequence thus detected in the current stage matches a known synchronization sequence (Step S7). When the sequence thus detected matches such a synchronization sequence, the synchronization sequence detection operation ends (Step S8), and the flow transits to a switching sequence detection operation. When the packet length W satisfies neither the condition expression in Step S3 nor the condition expression in Step S5, it is regarded as misdetection, and the flow returns to the synchronization sequence detection operation.

Examples of conceivable causes of misdetection based on the fact that the detected packet has a packet width W which is smaller than $T_1$ or otherwise is equal to or greater than $T_3$ include a case in which the packet thus detected is an ordinary data packet; a case in which multiple packets are joined and detected as a single packet; and the like. In such cases, the control information is regarded as not having been transmitted. The synchronization sequence is transmitted in order to prevent an abnormal operation due to misdetection of an ordinary data packet as a control packet. Furthermore, the packet interval is adjusted beforehand so as to prevent misdetection in which multiple packets are joined and detected as a single packet.

Figure 8:
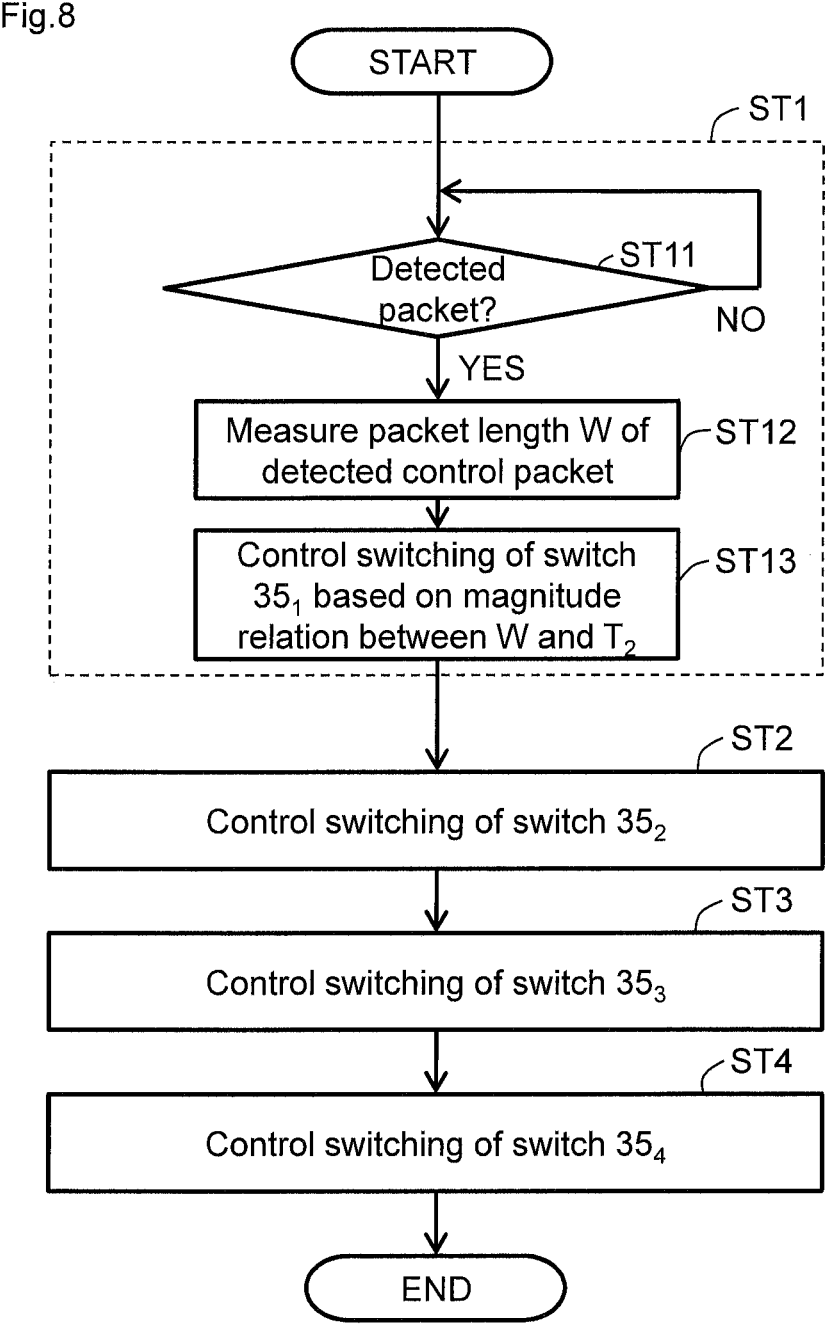
FIG. 8 is a flowchart showing an example of the operation of the emission control unit 21 shown in FIG. 1 for the switching sequence shown in FIG. 4.

FIG. 8 is a flowchart showing an example of the operation of the emission control unit 21 shown in FIG. 1 for the switching sequence shown in FIG. 4. First, specific description will be made regarding a switching control operation (Step ST1) of the switch $35_1$ shown in FIG. 2.

The signal analysis unit 25 judges whether or not a packet is detected (Step ST11). When no packet is detected, the signal analysis unit 25 continues the monitoring until a packet is detected. When a packet is detected (packet A in FIG. 4), the signal analysis unit 25 measures the period of time from the detected start time point up to the detected end time point with respect to this packet, thereby measuring the packet length W (Step ST12).

The signal analysis unit 25 compares the packet length W with the value of $T_2$ so as to acquire the antenna control information b ∈ {1, 0}. Specifically, when W<$T_2$, the signal analysis unit 25 takes the antenna control information b to be "1". Otherwise, the signal analysis unit 25 takes the antenna control information b to be "0". When the packet A shown in FIG. 4 is detected, the antenna control information b is taken to be "1". This allows the antenna control unit 27 to control the switch $35_1$ so as to select the antenna $37_1$ (horizontal antenna) or the antenna $39_1$ (vertical antenna). $T_2$ represents the time length, which is appropriately adjusted so as to allow the signal analysis unit 25 to detect the correct antenna control information.

Next, the switching control operation (Step ST2) of the switch $35_2$ is performed in the same way according to the packet B shown in FIG. 4. Furthermore, the switching control operation (Step ST3) of the switch $35_3$ is performed in the same way according to the packet C shown in FIG. 4. Moreover, the switching control operation (Step ST4) of the switch $35_4$ is performed in the same way according to the packet D shown in FIG. 4.

Figure 10:
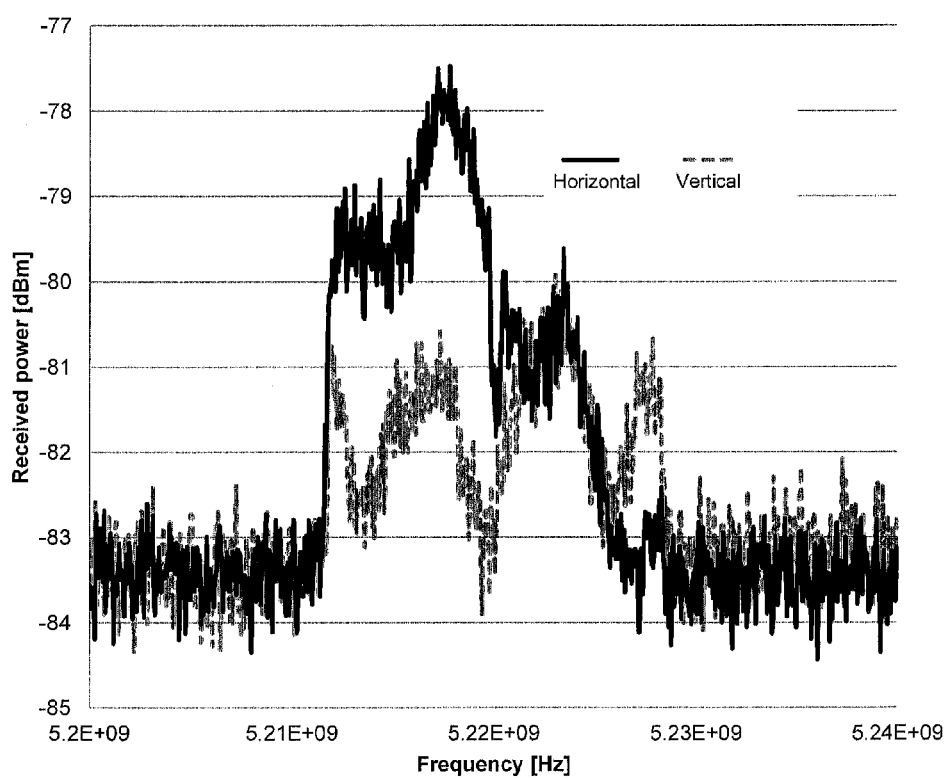
FIG. 10 is a diagram showing an example of a received spectrum waveform obtained by experiment.

Next, description will be made with reference to FIGS. 9 and 10 regarding experimental results obtained using a compact-size wireless packet forwarding device and an external multi-antenna system developed by the inventors.

FIG. 9 shows: (a) an example of a horizontal directionality pattern obtained by actual measurement; and (b) an example of a vertical directionality pattern obtained by actual measurement, using the external multi-antenna system. In these measurements, the synchronization sequence length of the control signal shown in FIG. 4 was set to 15, and the time lengths $T_1$, $T_2$, and $T_3$ were set to 200, 800, and 1400 [μsec], respectively.

Next, characteristics (the received spectrum) of the transmission channel between two relay stations were measured in a school building of Kyushu University. FIG. 10 shows an example of received spectrum waveforms. There is a difference in the received spectrum between the horizontal polarized wave and the vertical polarized wave. Thus, it can be confirmed that by adaptively switching the antenna directionality according to the installation layout of the relay stations, such an arrangement allows the relay line performance to be improved.

Furthermore, 100 trial transmissions of the antenna control signal (relay packet) were performed using the actual wireless packet forwarding device and the multi-antenna system. It was confirmed that each antenna was correctly switched in each trial transmission.

Figure 11:
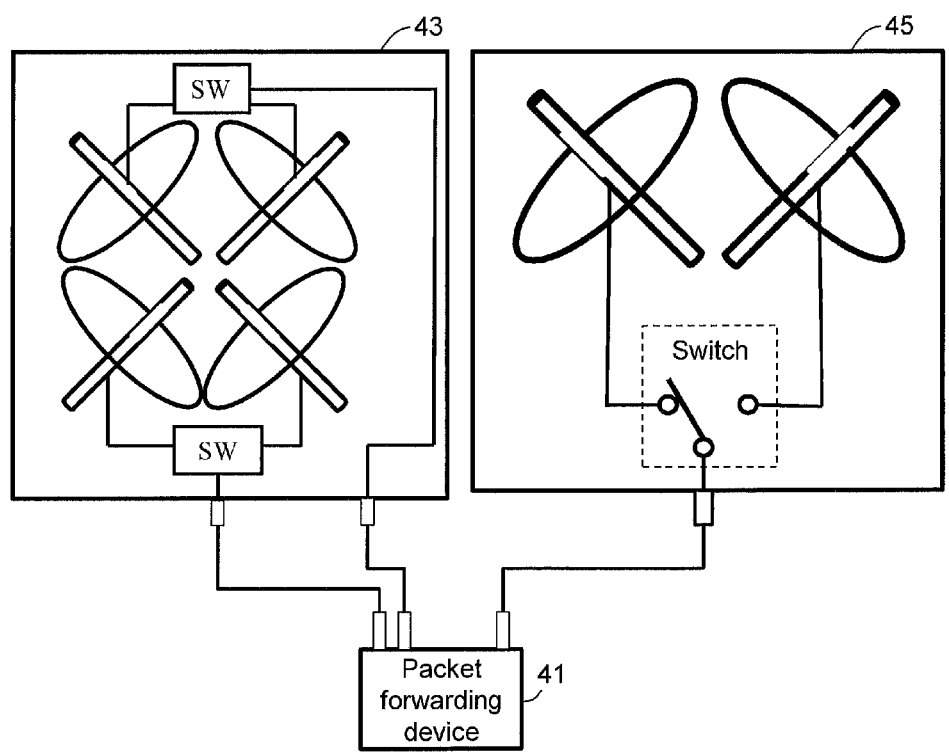
FIG. 11 is a diagram showing an example layout of the communication antennas $29_1$ through $29_n$ shown in FIG. 1, which is different from the layout shown in FIG. 2.

It should be noted that the present invention is not restricted to such a layout shown in FIG. 2. Also, the number of antenna terminals and the number of antennas are not each restricted to a particular number. For example, FIG. 11 shows a radio emission device 43 (which is an example of the radio emission device 5 shown in FIG. 1) and a radio emission device 45 (which is an example of the radio emission device 5 shown in FIG. 1) each connected to a packet forwarding device 41 (which is an example of the packet forwarding device 3 shown in FIG. 1). Also, a single switch may be configured to perform a switching operation for three or more antennas.

Description has been made with reference to FIG. 2 regarding an arrangement configured to perform an antenna switching control operation. However, the present invention is not restricted to such an arrangement. For example, the input/output signals of the respective antennas may be weighted in an adaptive manner, and a signal thus obtained may be used as an input/output signal. In a case of weighting the input/output signals of the respective antennas, the packet forwarding device 3 transmits the weighting information as a notice to the radio emission device 5 using the antenna control signal, for example. In order to provide such a function, a code book (reference table) which shows the relation between the weighting information and the control bit is prepared beforehand, and a control bit that corresponds to the weighting information may be transmitted as a notice using the antenna control signal.

Figure 12:
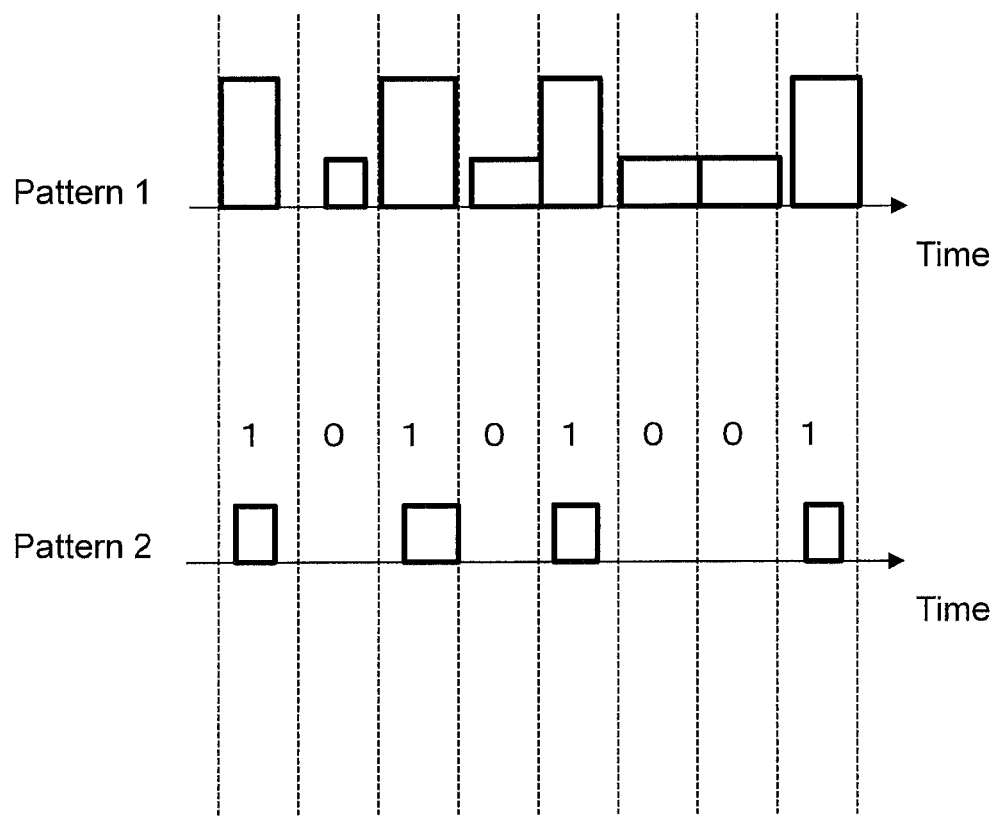
FIG. 12 is a diagram showing example characteristics that differ from the packet length, i.e., the magnitude of the transmission power (pulse amplitude) (pattern 1), and the presence or absence of a packet in a predetermined period.

Description has been made in the present embodiment regarding an arrangement in which the antenna control information is associated with the packet length. However, the present invention is not restricted to such an arrangement. For example, an arrangement may be made in which the transmission power parameter is configured to be switchable, and the antenna control information is associated with the magnitude of the packet transmission power (pulse amplitude) (see pattern 1 in FIG. 12). Also, an arrangement may be made in which the transmission time interval is configured to be switchable, and the antenna control information is associated with the presence or absence of a packet in a predetermined period of time (see pattern 2 in FIG. 12). It should be noted that, with such an arrangement in which the transmission power parameter is configured to be switchable, in some cases, the packet forwarding device cannot provide a high-precision change of the transmission power, e.g., a high-precision elevation of the transmission power, which is a conceivable problem. Furthermore, in some cases, the radio emission device cannot detect such a change in the transmission power with high precision, which is also a conceivable problem. With such an arrangement in which the transmission time interval is configured to be switchable, the transmission time interval has fluctuation that occurs due to the random fluctuation in the transmission timing provided by the interference evasion unit 9. In order to solve such a problem, examples of conceivable methods include a method in which a packet monitoring period is set to be equal to or greater than the fluctuation that can occur. However, providing a countermeasure to the extent of addressing packet transmission suspension (see pattern C in FIG. 3) is impractical. This is because such packet transmission suspension is not always performed at all times, and is performed depending on the surroundings. In contrast, the fluctuation due to the random backoff operation (see pattern B in FIG. 3) is provided at all times. Thus, an arrangement may preferably be made in which the packet monitoring period is set to be equal to or greater than the fluctuation that can occur due to the random backoff operation, and the control packet is transmitted multiple times so as to solve a problem due to the packet transmission suspension.

EXAMPLE 2

Description will be made in the present embodiment regarding an arrangement in which, in a wireless backhaul system having a large number of slave nodes connected to a core node, wireless communication among the respective nodes is provided according to the present invention using the intermittent periodic transmit forwarding method (IPT). Here, a node connected to a wired line will be referred to as a "core node", and a node connected to a different node via a packet forwarding line alone will be referred to as a "slave node". Furthermore, a packet forwarding line from the core node to a slave node will be referred to as a "downlink channel", and a packet forwarding line from a slave node to the core node will be referred to as an "uplink channel".

IPT is one of the packet forwarding transmission methods for a wireless backhaul system. IPT operations can roughly be classified into two steps. In the first step, routing is performed, i.e., downlink channels and uplink channels are determined. In the second step, a transmission source node (core node) intermittently transmits data packets in a periodic manner via the downlink channels, which is a normal operating state.

With IPT, by adjusting the frequency reuse interval to a suitable value for each packet forwarding path, such an arrangement is capable of suppressing signal interference, thereby providing high packet forwarding efficiency. Furthermore, the present inventors have proposed directional IPT as an extended protocol for directional antennas (see International Publication WO 2009/123112 pamphlet, for example). With the present embodiment, directional IPT is employed as the packet forwarding protocol. The packet forwarding routing is performed using a method based on minimum path loss routing. Minimum path loss routing is performed using the Bellman-Ford algorithm.

It is a feature of directional IPT that various kinds of directional antenna combinations are evaluated by switching the directional antenna at each slave node in a periodic manner, so as to autonomously select a combination of a path and a directional antenna that provides the minimum metric. Such an arrangement is capable of autonomously selecting the directional antennas that provide the minimum value of the sum of the path losses from each slave node up to the core node, without the location information of each slave node.

Figure 13:
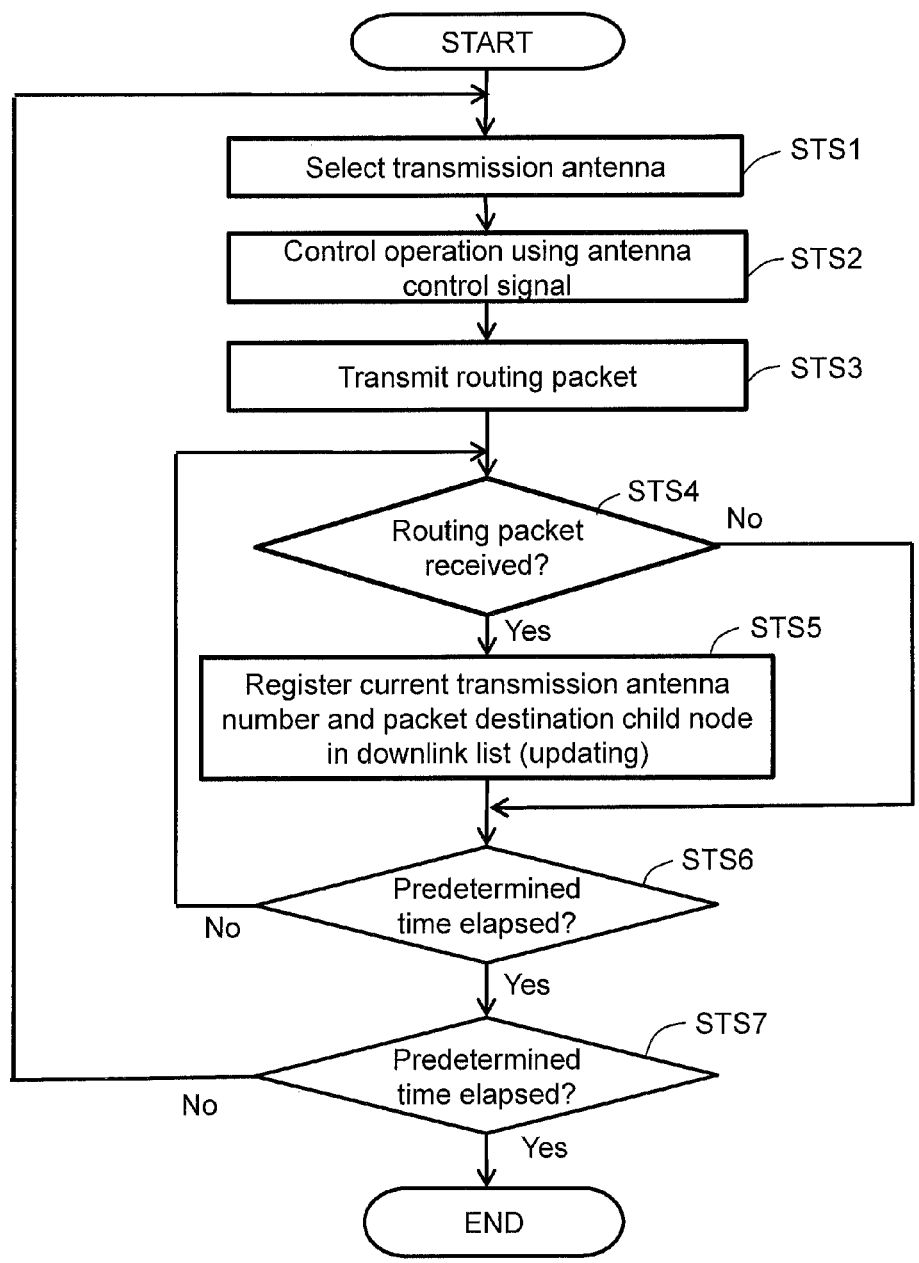
FIG. 13 is a flowchart showing a schematic configuration of a processing procedure according to another embodiment of the present invention, executed for each node when a routing packet is transmitted.
Figure 14:
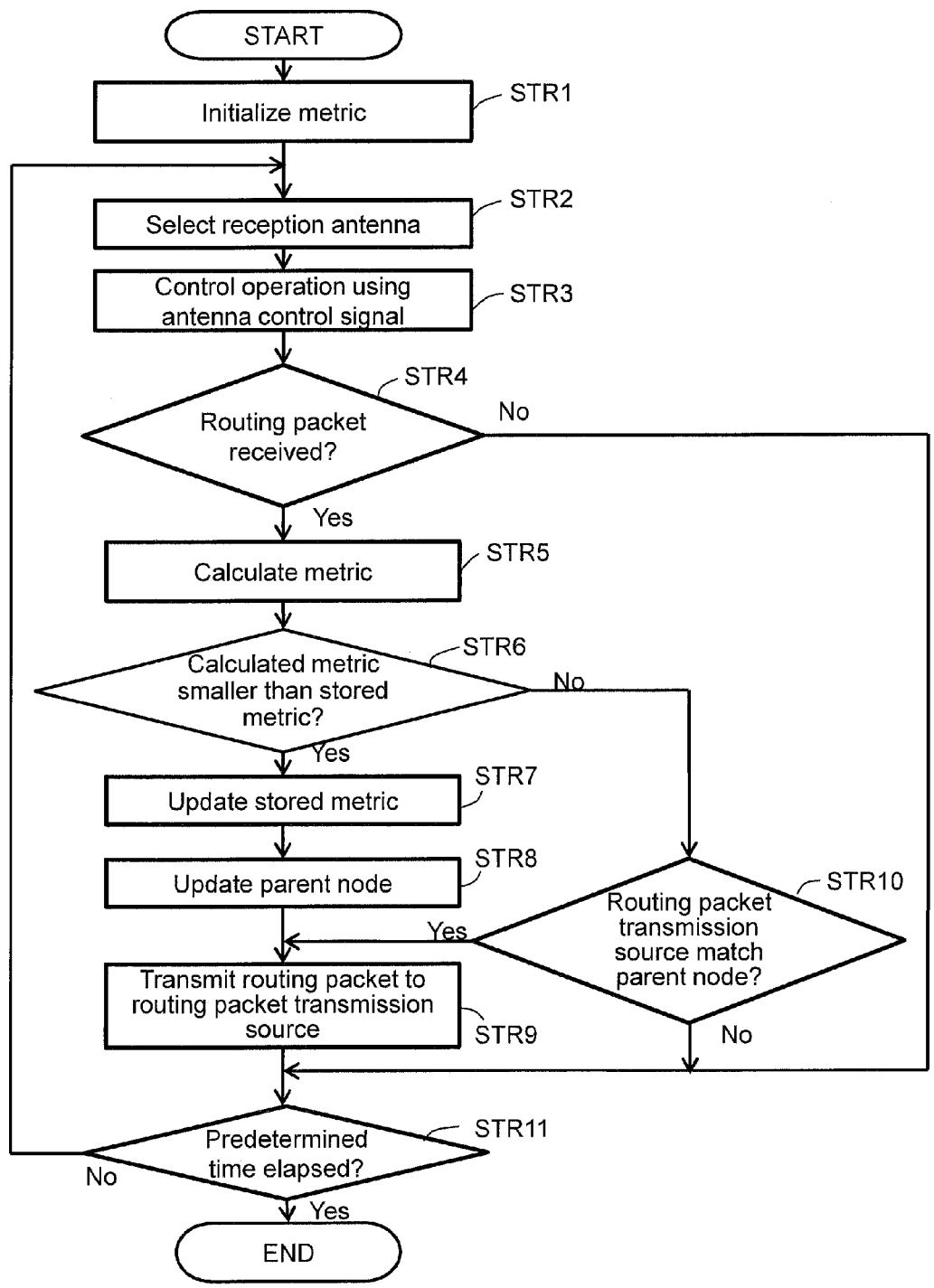
FIG. 14 is a flowchart showing a schematic configuration of a processing procedure according to another embodiment of the present invention, executed for each node when the routing packet is received.

FIGS. 13 and 14 are flowcharts each showing an example of the packet forwarding routing procedure for each slave node. First, each slave node performs a routing packet reception operation. Subsequently, the slave node performs a routing packet transmission operation. The core node performs only the routing packet transmission operation. Thus, the operation of the core node is substantially the same as the routing packet transmission operation shown in FIG. 13.

FIG. 13 is a flowchart showing a schematic configuration of an operation procedure performed for each node when a routing packet is transmitted. First, the antenna control unit 27 shown in FIG. 1 randomly selects one from among the communication antennas $29_1$ through $29_n$, and performs the antenna switching control operation using the antenna control signal (Step STS1). Next, the packet generation unit 7 broadcasts and transmits the routing packet (Step STS2). The antenna control unit 27 waits for a response (routing packet) from a different node after the different node receives the routing packet (Step STS3). When the routing packet is received (Step STS4), the control unit 6 registers, in the downlink node list, the transmission antenna number selected in the current stage and the information included in the routing packet (Step STS5). The routing packet includes information with respect to all the downlink node numbers which a packet can reach via the node that transmitted the routing packet. In a case in which a routing packet is received from the node that transmitted the routing packet in the previous routine, the information is updated. Such a processing routine is repeatedly performed for the transmission antenna thus selected until a predetermined period of time elapses (Step STS6). After the predetermined period of time elapses, the transmission antenna is randomly switched again, and the same routine is executed (Step STS7). The aforementioned routine is repeatedly executed until the packet forwarding path is fixed.

FIG. 14 is a flowchart showing a schematic configuration of a processing procedure for each slave node when it receives a routing packet. First, the control unit 6 shown in FIG. 1 initializes the metric (Step STR1). The metric is configured as an index which indicates the packet forwarding performance among the respective nodes. For example, the received power of the relay packet can be used as such a metric. The antenna control unit 27 randomly selects the reception antenna (Step STR2), and performs the antenna switching control operation using the antenna control signal (Step STR3). When a routing packet is received (Step STR4), the control unit 6 calculates the metric (Step STR5), and compares the metric thus calculated with the metric calculated and stored in the previous routine (Step STR6). When the metric thus calculated is smaller than the stored metric, the stored metric is updated to the metric thus calculated in the current routine (Step STR7), and the transmission source of the routing packet is registered as a parent node (Step STR8). If the parent node has already been registered, the information is updated. Next, the routing packet is transmitted to the transmission source node of the routing packet (Step STR9). When the metric value thus calculated is greater than the stored metric, the transmission source of the routing packet is checked (Step STR10). When the transmission source node matches the parent node, the routing packet is transmitted as a notice to the transmission source node (Step STR9). The aforementioned operation is repeatedly performed until a predetermined period of time elapses (Step STR11).

With IPT, by performing transmission/reception of the routing packets, the downlink channels and the uplink channels are autonomously determined. If the number of nodes is changed, or if the layout of the nodes is changed, the routing packets are transmitted and received in the operation so as to perform routing. Thus, except for the routing packets, the directional antenna is not switched in transmission and reception of the ordinary data packets.

Thus, with reference to the routing information generated by the control unit 6, the packet generation unit 7 shown in FIG. 1 is capable of notifying the radio emission device 5 of the emissive direction and/or the emissive intensity (particularly the emissive direction) for the transmission destination node for each packet. Furthermore, in the same way, such an arrangement is capable of determining the communication antenna beforehand for receiving a signal (more generally, the packet reception direction can be determined). Thus, such an arrangement allows the antenna control unit 27 to measure the communication antenna determined beforehand, and to transmit the received signal to the control unit 6.

Thus, the present invention provides a marked advantage to directional IPT which is designed assuming that data packets are transmitted and received in a static node layout.

Figure 15:
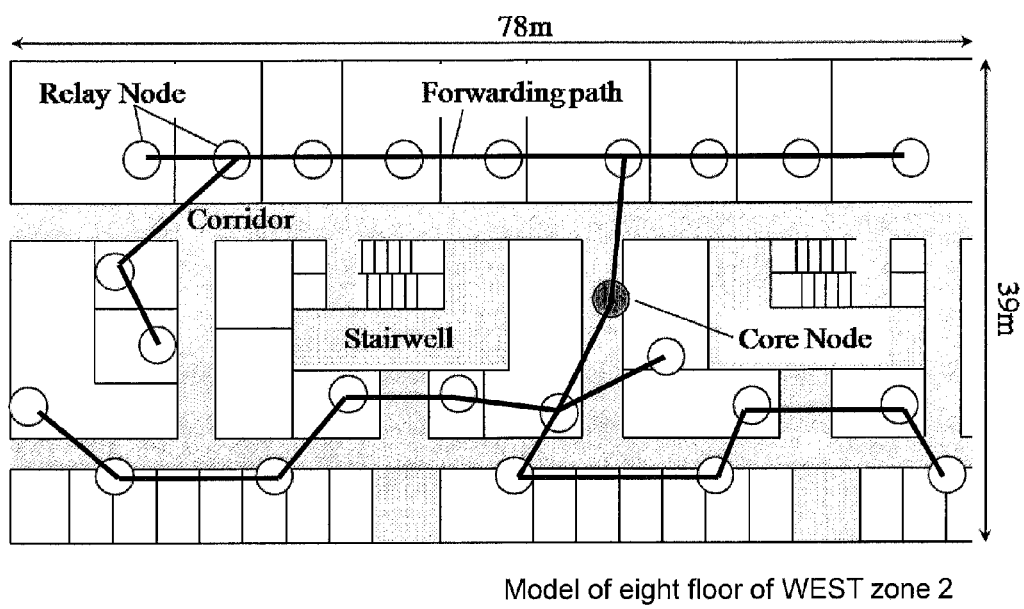
FIG. 15 is a diagram showing an example of a packet forwarding path, constructed by simulation, according to another embodiment of the present invention.
Figure 16:
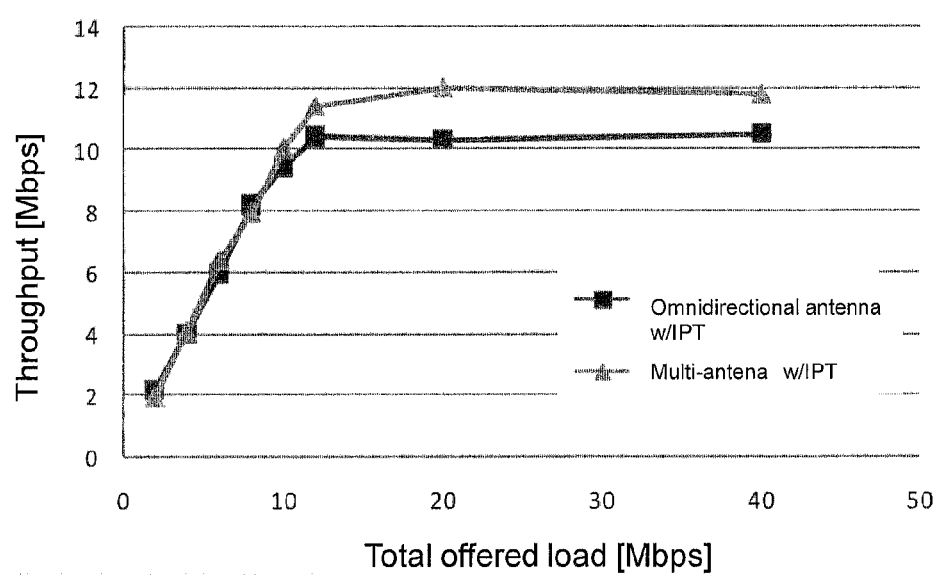
FIG. 16 is a diagram showing the simulation result of the system throughput obtained by a method according to the present invention, and the simulation result of the system throughput obtained by a method employing a conventional omnidirectional antenna.

Next, referring to FIGS. 15 and 16, description will be made regarding evaluation of a wireless backhaul system employing directional IPT and the multi-antenna system according to the present embodiment, which was made by means of computer simulation. The packet forwarding performance was evaluated by means of computer simulation in a case in which the present invention was applied to a wireless backhaul system using a packet forwarding protocol for the directional antenna.

The evaluation was performed assuming a two-dimensional node layout configured according to a model of the eighth floor of the West Zone 2 Building, Kyushu University. Each antenna employed in the evaluation has the same directional patterns as those shown in FIG. 9. In order to confirm the advantage of employing the proposed method, comparison is made between the packet forwarding performance provided by the present embodiment and the packet forwarding performance provided by an omnidirectional antenna system employing the IPT protocol. PHY/MAC is assumed to be as stipulated in IEEE 802.11a, and the PHY transmission rate is set to 54 Mbps. Furthermore, the MAC layer model is assumed to be the DCF (Distributed Coordination Function)/basic mode. The required value of the SINR (signal to interference and noise power ratio) is taken to be 10 dB. If the packet quality (SINR measurement value) of a received packet is equal to or greater than the required value, packet reception is assumed to succeed with a probability of 100%, and packet reception is otherwise assumed to fail with a probability of 100%. If packet reception fails (when the SINR measurement value does not satisfy the required value), the same packet is retransmitted a maximum of seven times. If all the retransmissions are failures, this is taken to be a packet loss. Traffic is assumed to occur according to a Poisson distribution, and the number of packets in each packet burst is determined according to a log-normal distribution. Moreover, the total uplink/downlink traffic ratio is taken to be 1:10, and when a radio wave passes through a single wall, the shadowing is taken to be 12 [dB]. As the evaluation parameter, system throughput was employed. FIG. 15 shows an example of a packet forwarding path constructed according to the node layout of the aforementioned model. FIG. 16 shows the system throughput provided by means of the method (multi-antenna w/IPT) according to the present embodiment configured to perform the antenna switching control operation so as to construct the packet forwarding path, and the system throughput provided by means of a conventional path construction method (omnidirectional antenna w/IPT) using omnidirectional antennas. The vertical axis represents the throughput, and the horizontal axis represents the traffic density (total offered load). As can be understood from FIG. 16, it was confirmed that the method according to the present embodiment provides improvement in throughput of approximately 12.6%, as compared with the conventional path construction method.

REFERENCE SIGNS LIST

1 packet communication system, 3 packet forwarding device, 5 radio emission device, 6 control device, 7 packet generation unit, 9 interference evasion unit, 11 antenna terminal 21 emission control unit, 23 directional antenna unit, 25 signal analysis unit, 27 antenna control unit, $29_1$ through $29_n$ communication antenna.

The invention claimed is:

1. A packet communication system configured to transmit packets, controlling one of or otherwise both of emissive direction and emissive intensity of the packets, the packet communication system comprising:
   a packet forwarding device; and
   a radio emission device,
   wherein the packet forwarding device comprises:
      an antenna terminal connected to the radio emission device; and
      a packet generation unit configured to generate a switching control packet by changing a property of a packet without changing its contents according to one bit or otherwise a plurality of bits included in a switching sequence which specifies one of or otherwise both of the emissive direction and the emissive intensity, and to output the packet thus generated to the radio emission device via the antenna terminal,
   and wherein the radio emission device comprises:
      a directional antenna which allows one of or otherwise both of the emissive direction and the emissive intensity to be controlled;
      a signal analysis unit configured to identify one bit value or otherwise a plurality of bit values by analyzing the property of the switching control packet without analyzing the contents of the switching control packet; and
      an antenna control unit configured to control one of or otherwise both of the emissive direction and the emissive intensity of the directional antenna unit based on a bit sequence including the one bit or otherwise the plurality of bits thus identified.

2. The packet communication system according to claim 1, wherein the packet generation unit is configured to change the property of the switching control packet without changing its contents by generating the switching control packet by changing one of or otherwise both of a packet length parameter and a transmission power parameter according to the one bit or otherwise the plurality of bits included in the switching sequence,
   and wherein the signal analysis unit is configured to identify the one bit value or otherwise the plurality of bit values by analyzing one of or otherwise both of the packet length of the switching control packet and its transmission power.

3. The packet communication system according to claim 1, wherein the directional antenna unit comprises a plurality of communication antennas,
   and wherein the plurality of communication antennas are each configured as a directional antenna, and are arranged such that a null-point direction of each communication antenna is covered by the other communication antennas,
   and wherein the switching sequence is configured to specify a part of the plurality of communication antennas, or otherwise to specify weighting information of each of the respective communication antennas, or otherwise to specify a part of the plurality of communication antennas and specify weighting information of each of the communication antennas thus specified,
   and wherein, based on the bit sequence, the antenna control unit is configured to instruct the part of the communication antennas thus specified to emit radio waves, or otherwise to combine a signal according to the weighting information thus specified and instruct the communication antennas to emit radio waves, or otherwise to instruct the part of the communication antennas thus specified to combine a signal according to the weighting information and emit radio waves.

4. The packet communication system according to claim 1, wherein the packet generation unit comprises an interference evasion unit configured to automatically change a transmitting timing of the switching control packet which is generated, independently of generation of the switching control packet, when the packet generation unit outputs the switching control packet to the radio emission device,
   and wherein the properties of the switching control packet to be analyzed by the signal analysis unit, which are different from the contents of the switching control packet, are maintained after the interference evasion unit changes the transmitting timing.

5. The packet communication system according to claim 1, wherein the packet generation unit is configured to generate a synchronization control packet for distinguishing the switching control packet from the other kinds of packets, and to control generation of the switching control packet,
   and wherein, when one bit or otherwise a plurality of bits included in the switching sequence is a predetermined value or otherwise a predetermined value set, the packet generation unit does not generate the switching control packet during a predetermined period of time,
   and wherein the signal analysis unit is configured to identify one bit value or otherwise a plurality of bit values as the predetermined value or otherwise as the predetermined value set when the signal analysis unit does not detect the switching control packet in a predetermined period of time after it detects the synchronization control packet.

6. A packet communication system comprising one core node or otherwise a plurality of core nodes, and a plurality of slave nodes, and configured to provide wireless communication between respective nodes,
   wherein the core nodes each comprise a packet forwarding device and a radio emission device and a part of or otherwise all of the slave nodes each comprise the packet forwarding device and the radio emission device,
   and wherein, when a position of any one of the nodes changes, or when the number of core nodes or the number of slave nodes changes, a routing packet is transmitted/received among the core nodes and the slave nodes so as to determine a downward route which is a route from the core node down to the respective slave nodes, and an upward route which is a route from the respective slave nodes up to the core node,
   and wherein each node comprising the packet forwarding device and the radio emission device is configured to determine one of or otherwise both of the emissive direction and the emissive intensity of the radio emission device according to a destination node to which the node is to transmit a data packet which is transmitted and received between nodes and which is different from the routing packet, and to determine the reception direction of the radio emission device according to a source node from which the node is to receive the data packet, and wherein the packet forwarding device comprises:
- an antenna terminal connected to the radio emission device; and
- a packet generation unit configured to generate a switching control packet by changing a property of a packet without changing its contents according to one bit or otherwise a plurality of bits included in a switching sequence which specifies one of or otherwise both of the emissive direction and the emissive intensity, and to output the packet thus generated to the radio emission device via the antenna terminal, and wherein the radio emission device comprises:
- a directional antenna which allows one of or otherwise both of the emissive direction and the emissive intensity to be controlled;
- a signal analysis unit configured to identify one bit value or otherwise a plurality of bit values by analyzing the property of the switching control packet without analyzing the contents of the switching control packet; and
- an antenna control unit configured to control one of or otherwise both of the emissive direction and the emissive intensity of the directional antenna unit based on a bit sequence including the one bit or otherwise the plurality of bits thus identified, and to output, to the packet forwarding device via the antenna terminal, a received signal obtained by detecting a signal in the reception direction.

7. An emission control apparatus connected to an antenna terminal, and configured to control one of or otherwise both of an emissive direction and an emissive intensity of a directional antenna unit which allows one of or otherwise both of the emissive direction and the emissive intensity to be controlled, the emission control apparatus comprising:
- a signal analysis unit configured to identify one bit value or otherwise a plurality of bit values by analyzing a property of a switching control packet detected when detecting a signal of the antenna terminal without analyzing the contents of the switching control packet; and
- an antenna control unit configured to control one of or otherwise both of the emissive direction and the emissive intensity of the directional antenna unit based on o a bit sequence including the one bit or otherwise the plurality of bits thus identified.

8. An antenna control method for controlling one of or otherwise both of an emissive direction and an emissive intensity, the antenna control method comprising:
- signal analyzing in which one bit value or otherwise a plurality of bit values are identified by analyzing a property of a switching control packet detected when detecting a signal of an antenna terminal, the property other than the contents of the switching control packet; and
- controlling one of or otherwise both of the emissive direction and the emissive intensity of a directional antenna unit which allows one of or otherwise both of the emissive direction and the emissive intensity based on a bit sequence including the one bit or otherwise the plurality of bits thus identified.

* * * * *